United States Patent

[11] 3,622,253

| [72] | Inventors | Donelson B. Horton<br>Madison;<br>Shelby E. Shelton, Huntsville, both of Ala. |
|---|---|---|
| [21] | Appl. No. | 874,352 |
| [22] | Filed | Nov. 5, 1969 |
| [45] | Patented | Nov. 23, 1971 |
| [73] | Assignee | John Blue Company, a Division of<br>Subscription Television, Inc.<br>New York, N.Y. |

[54] PUMPING DEVICE FOR APPLYING LIQUID MARKINGS
15 Claims, 5 Drawing Figs.

[52] U.S. Cl. ................................................. 417/223,
417/471, 111/25
[51] Int. Cl. ........................................................ F04b 49/00
[50] Field of Search ........................................... 123/48 C;
417/223, 489, 471, 568; 92/60.5; 111/25; 239/157

[56] References Cited
UNITED STATES PATENTS

| 1,360,366 | 11/1920 | Charter ........................ | 123/48 C |
| 1,532,788 | 4/1925 | Vandervell .................... | 123/48 C |
| 2,766,701 | 10/1956 | Giraudeau ..................... | 417/568 |
| 3,339,843 | 9/1967 | Horton .......................... | 239/157 |

FOREIGN PATENTS

| 612,096 | 7/1926 | France ......................... | 417/568 |

Primary Examiner—Carlton R. Croyle
Assistant Examiner—Richard E. Gluck
Attorney—Cushman, Darby & Cushman ABSTRACT: Agricultural spray equipment is provided with a pumping device which intermittently dispenses a liquid for marking the location of spray application. The pumping device includes two cranking mechanisms for reciprocating a piston relative to a chamber through which liquid can be metered and pumped. Provision is made for adjusting the quantity of liquid pumped and the frequency of intermittent dispensing. Also, the pumping device is provided with a safeguard which prevents damage to the device in the event that equipment becomes clogged and a high-fluid pressure is built up in the pumping device.

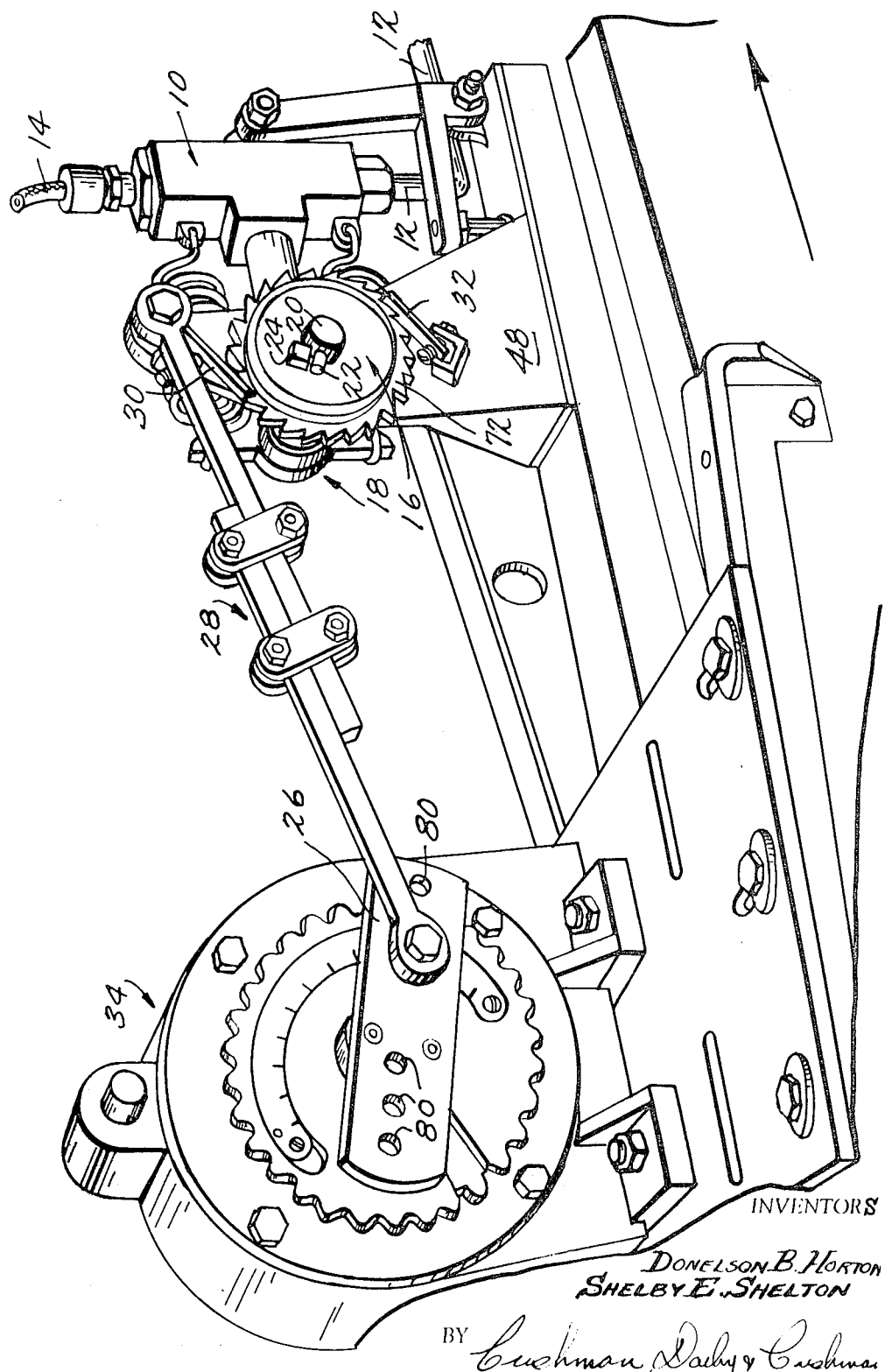

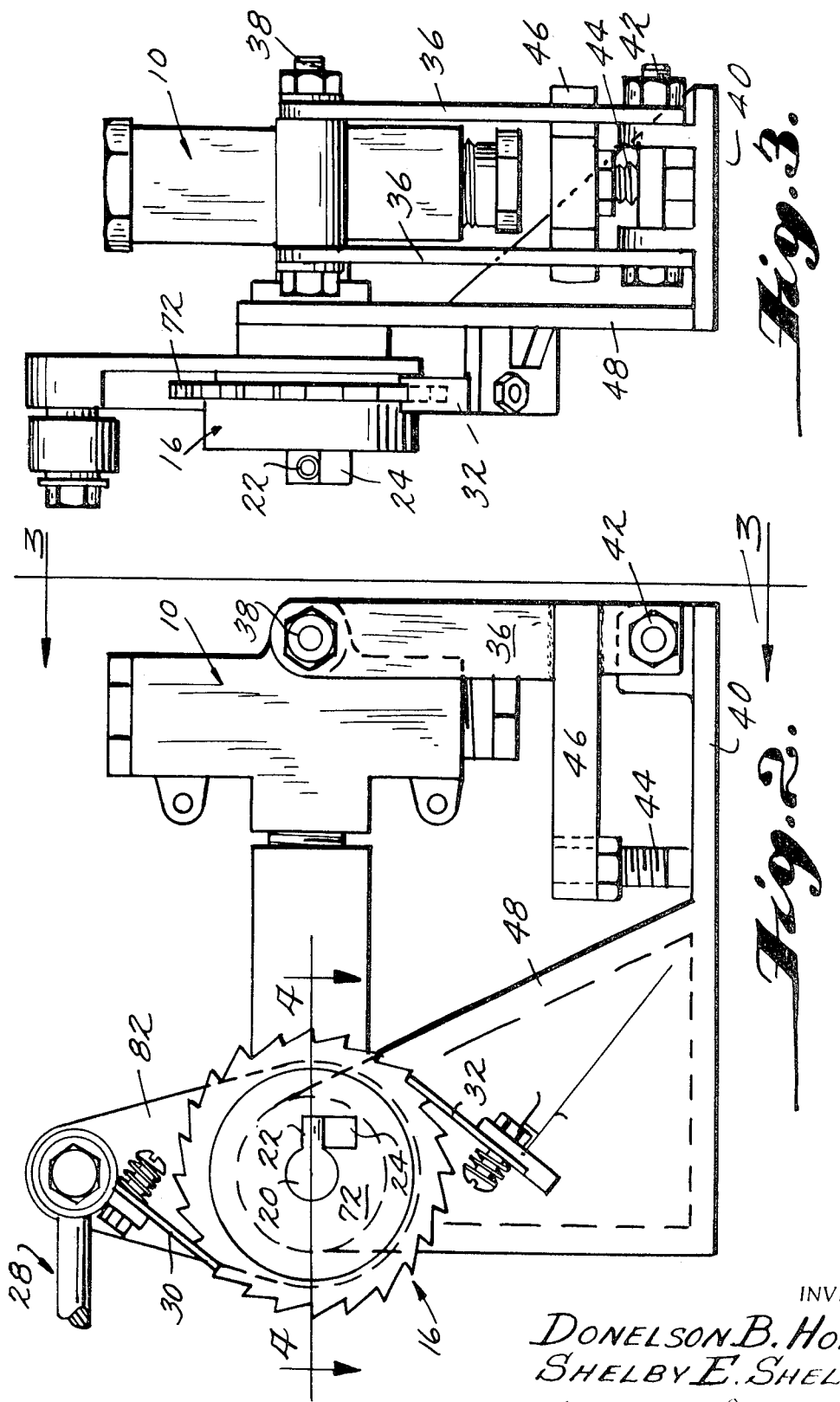

INVENTORS
DONELSON B. HORTON
SHELBY E. SHELTON
BY Cushman, Darby & Cushman
ATTORNEYS 3,622,253

PUMPING DEVICE FOR APPLYING LIQUID MARKINGS

BACKGROUND AND BRIEF DESCRIPTION OF INVENTION

This invention relates to improvements in agricultural equipment of the type which marks the locations of liquid application to the earth or to vegetation. In particular, the invention is concerned with an improved pumping device for pumping a dye marking liquid at relatively high-pressures to mark the limits of application of fertilizers, herbicides, or other liquids which are applied by conventional agricultural spraying equipment.

It is known in this art to provide for spraying equipment which can be mounted on a self-propelled vehicle or on a trailer for dispensing fertilizer, herbicides, and other agricultural liquids onto vegetation or onto the earth. Typically, such spraying equipment includes a boom with a plurality of dispensing nozzles spaced across the boom, and application of liquid takes place in a swath defined by the length of the boom and the number of dispensing nozzles provided thereon. In the use of such equipment, it is desirable to provide some means for marking the location of each swath of liquid application that is applied to vegetation or to the earth. Marking is desirable to prevent overlapping or skipping of liquid application in subsequent swaths that are applied in continued traverses back and forth across a field. Representative of the prior art on the general subject of marking fields for agricultural purposes are the U.S. Pat. Nos. 2,199,421 and 3,339,843.

In accordance with prior art systems for marking, of the type described in the above two patents, a colored liquid or dye is dispensed at relatively low-pressure to a dispensing nozzle positioned along the line to be marked. Relatively simple pumping devices have been adequate to handle such low-pressure dye dispensing. However, such prior art systems have had several disadvantages. The primary disadvantage is that low-pressure (typically, between 20 to 30 p.s.i.) delivery systems are limited in their capacity to deliver certain liquids which have been found to be more suitable for marking fields. In particular, it has been found that certain modern dye liquids, especially those for white dye markings, are relatively viscous and require much higher pressures to dispense and to atomize for marking purposes. Prior art systems that have utilized water as the delivery medium for a dye have been somewhat limited to uses of dyes that are relatively dark in color and not easily seen in field use.

In accordance with the present invention, an improved pumping device is provided for a marking system that can be utilized with agricultural appliances. The improved pumping system of this invention is economical to manufacture and use, and it lends itself to the use of viscous materials because it is capable of pumping in a desired range of around 200 p.s.i. Also the pumping system reduces the quantity of water, or other carrier, which may be used with dye, and it permits the use of nonfreezing solutions because of the greatly reduced quantities of liquid required for marking. Further, the pumping device of this invention can be readily adjusted to provide for a control of quantity of liquid dispensed as well as frequency of spacing of an intermittent marking across a field. By providing for an intermittent dispensing of marking liquid, much less dye and carrier liquid are required than required with prior art systems. The improved pumping device of this invention can be easily constructed from noncorrosive materials, such as stainless steel, and the device is readily adapted to existing equipment.

In accordance with the invention, a pumping device is provided with a reciprocating piston to draw a quantity of liquid into a chamber and to then force the quantity of liquid out of the chamber to a dispensing nozzle end of a conduit. The chamber and its piston are mounted relative to a base so that the piston does not move into the chamber if pressure conditions within the chamber are too high to allow a forcing of the liquid through the conduit or its nozzle. Such conditions may arise if the nozzle becomes completely clogged, and this feature prevents damage to the pumping device by continued operation of the reciprocating piston relative to the chamber. The pumping device is also provided with a novel mechanism for driving the piston so that intermittent dispensing can be obtained. The driving mechanism includes a first cranking means for imparting reciprocal movements to the piston together with a ratchet wheel drive assembly for intermittently engaging and rotating the first cranking means. The ratchet wheel drive assembly is, in turn, driven by a second cranking means which moves a push rod and pawl so as to rotate the ratchet wheel drive assembly. By adjusting the stroke of the push rod, it is possible to adjust the amount of rotation of the ratchet wheel drive assembly with each rotation of the second cranking means. The second cranking means is preferably rotated in relationship to the ground speed of a vehicle to which the pumping device is attached. In addition the invention provides for an adjustment of the position of the chamber relative to the reciprocating piston so that the quantity of liquid drawn into, and pumped from, the chamber can be carefully regulated. Thus, it is possible to regulate quantity of liquid delivered by each pumping action, and it is possible to change the frequency or spacing of intermittent markings which result from the dispensing of pumped liquid from a nozzle carried by a moving vehicle.

Pumping mechanisms utilizing reciprocating pistons and cranking mechanisms are known in this art, but the present invention represents an improvement in such mechanisms for uses which require relatively high-pressure dispensing of a liquid at known intermittent spacings and in metered quantities. Representative patents showing prior art pumping devices utilizing reciprocating pistons are U.S. Pat. Nos. 494,738; 922,604; 2,784,808 and 2,896,542.

These and other advantages and features of this invention will become more apparent in the detailed description that follows, and in the detailed description reference will be made to the accompanying drawings as briefly described below.

BRIEF DESCRIPTION OF DRAWINGS

FIG. 1 is a perspective view of an actual construction of a pumping device in accordance with the present invention, as mounted on the frame of a vehicle which is used for spraying liquids onto crops or onto the earth;

FIG. 2 is a side elevational view of a portion of the pumping device of this invention, showing a pump housing and ratchet wheel drive assembly associated therewith;

FIG. 3 is an elevational end view of the portion of the device illustrated in FIG. 2, as seen on line 3—3 of FIG. 2;

DETAILED DESCRIPTION OF INVENTION

Figure 4:
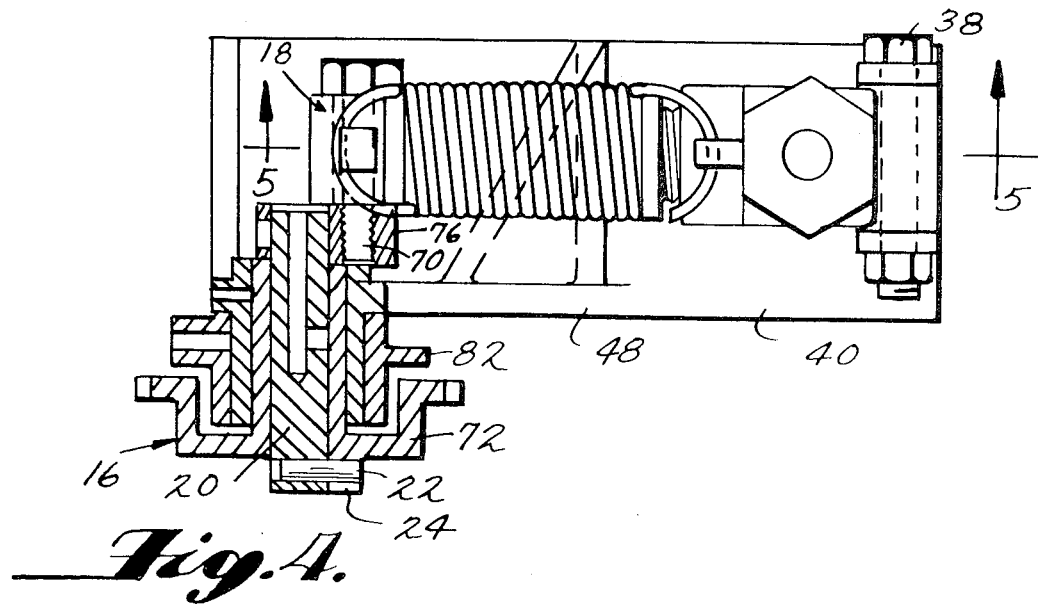
FIG. 4 is a top plan view, partially in cross section, of the device shown in FIGS. 2 and 3, with the sectioned portion being at line 4—4 of FIG. 2.

FIG. 1 illustrates an actual embodiment of the present invention, as installed on the frame of a vehicle (truck or trailer unit) of the type which carries a spray boom for dispensing agricultural solutions. The arrow in the figure represents the forward end of the vehicle, and details of vehicle construction have been omitted for purposes of emphasizing and clearly disclosing the pumping device of this invention. The illustrated pumping device includes a number of basic components. A housing 10 includes a chamber therein which receives liquid from an inlet pipe or hose 12 for dispensing through an outlet pipe or hose 14. The inlet pipe 12 is connected to a suitable source of supply of the liquid to be dispensed, and the pipe 14 communicates with a spray nozzle mounted at the end of a boom and directed downwardly towards the earth so as to mark the outer limit of travel of the boom. Typical boom constructions of the type contemplated by this invention are shown in U.S. Pat. No. 3,339,843 owned by the assignee of this invention. Pumping of liquid into and out of the chamber 10 is accomplished by reciprocal movements of a piston (not shown in FIG. 1) into and out of the chamber in cooperation with one-way check valve means associated with inlet and outlet passageways to the chamber. Details of construction and operation of the piston means and of the one-way valve will be presented later in this specification with reference to other drawings accompanying this case.

FIG. 1 also shows a ratchet wheel assembly 16 which functions to periodically engage and rotate a first cranking means 18. The first cranking means 18 functions to reciprocate a piston into and out of the chamber within the housing 10. The first craning means 18 has a fixed center axis of rotation represented by the center of its crankshaft 20. Crankshaft 20 includes a projecting pin 22 which is periodically engaged by a projecting element 24 carried by a ratchet wheel portion of the ratchet wheel drive assembly 16. Thus, counterclockwise rotation of the ratchet wheel causes the element 24 to periodically engage the projecting pin 22 to drive the cranking means 18. Because the cranking means utilizes springs to assist in the reciprocation of the piston, the projecting element 24 does not engage the pin 22 during complete revolution of the ratchet wheel of the ratchet wheel drive assembly 16. The ratchet wheel drive assembly is rotated by a second cranking means 26 having a push rod 28 carrying a pawl 30. Rotation of the second cranking means 26 causes the push rod 28 to reciprocate back and forth in a manner to engage the pawl 30 with one of the teeth of the ratchet wheel for rotating the ratchet wheel. A second pawl 32 prevents reverse (clockwise) rotation of the ratchet wheel during intervals when it is not being directly driven by the pawl 30. The second cranking means 26 is driven by a drive motor means represented at 34, and the drive motor means may be of any conventional construction to impart a rotation to the cranking means 26. The illustrated driving motor means 34 is of a type to be driven by a chain drive connected to the drive of the vehicle upon which the pumping device is mounted. With this arrangement, the driving means 34 is driven in relation to ground speed of the vehicle, and this provides for a desired relationship of pumping and marking with actual travel rate of the vehicle across a field.

As an example of a driving arrangement used in actual practice, a ground driven metering pump of the type shown in U.S. Pat. No. 2,933,049 has been operatively connected to the pumping unit of this invention as a drive motor means 34.

FIGS. 2–5 illustrate details of construction for the basic pumping unit, its adjustment features, and the means by which it is driven for pumping liquid in an intermittent dispensing action. FIGS. 2 and 3 show the housing 10 as being mounted on a mounting means 36. The mounting means 36 is shown in the form of two upright members pivotally connected to the housing 10 about the center axis of the bolt 38. The mounting means 36 is mounted on a base member 40 which supports certain elements of the pumping device so as to fix their positions relative to the position of the housing 10. The mounting means 36 is pivotally connected to the base 40 by a fastening bolt 42, and this permits rocking movement of the entire mounting means 36 under certain circumstances that will be described later. Further, the pivotal mounting of the mounting means 36 relative to the base 40 permits an adjustment of the actual position of the housing 10 relative to fixed components of the pumping device. An adjustment screw 44 is threaded into a threaded bore at the end of an arm 46 fixed to the mounting means 36. By turning the adjustment screw 44 into or out of the threaded bore, the mounting means 36 will be moved one way or the other about an axis defined by the center axis of bolt 42. This movement swings the housing 10 to the left or right, as viewed in FIG. 2, and this provides for an adjustment in quantity of liquid which will be drawn into a chamber within the housing 10. Liquid is drawn into the chamber by a piston reciprocated from the fixed center axis cranking means 18, and the cranking means 18 is carried by an upwardly extending portion 48 of the base 40.

Figure 5:
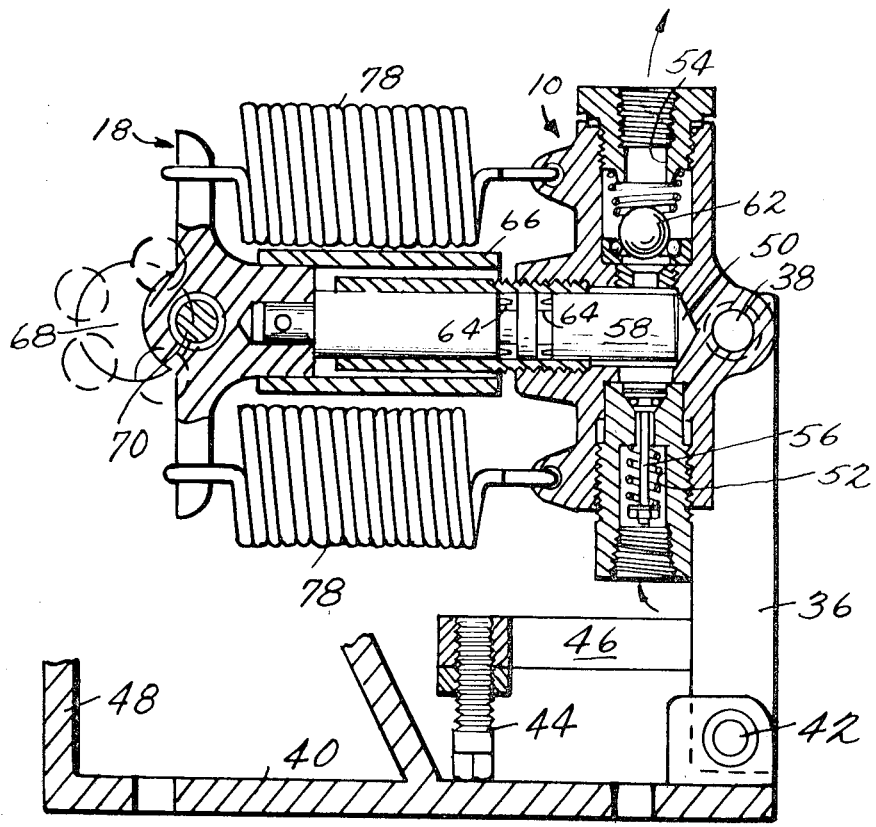
FIG. 5 is a side elevational view, partly in cross section, as seen on line 5—5 of FIG. 4.

FIGS. 4 and 5 illustrate details of construction concerned with actual pumping of liquid through the housing 10. As shown in the sectional view of FIG. 5, the housing 10 includes a chamber 50 formed therein to receive and to dispense a quantity of liquid. Liquid enters the chamber 50 by way of an inlet passageway 52, and liquid is pumped from the chamber 50 by way of an outlet passageway 54. Each of the passageways 52 and 54 is controlled by a one-way check valve means. A one-way check valve means 56 controls the inlet passageway 52. The one-way check valve 56 is spring urged to normally maintain the passageway closed so that liquid within the chamber 50 cannot leave the chamber 50 by way of the inlet 52. However, the one-way valve 56 is opened by the pressure of liquid being drawn into the chamber 50 when a piston means 58 is drawn outwardly from the chamber 50. The piston means 58 is fitted in a cylinder 60 and is connected to the first cranking means 18 so as to be reciprocated back and forth, out of and into the chamber 50, when the cranking means is operated. When the piston means 58 is drawn outwardly from the chamber 50 (towards the left in the FIG. 5 view), a pressure differential is established on opposite sides of the valve 56, and liquid is drawn into the chamber 50 by the pressure of fluid overcoming the spring bias of the valve. In a similar manner, a ball-check valve 62 is provided at the outlet passageway 54, and the valve 62 is also a one-way valve designed to permit fluid flow out of the chamber 50 but not back into the chamber 50 by way of the outlet passageway 56. The check valve 62 is spring biased to a normally closed position so that when liquid is being drawn into the chamber 50 by movement of the piston means 58 outwardly therefrom, there is no drawing of liquid back through the passageway 54. However, when the piston means 58 is reciprocated back into the chamber 50 (towards the right in FIG. 5) liquid is forced past the check valve 62 and through the outlet 54. The pressure of the liquid in the chamber 50 assists in maintaining the one-way valve 56 in a closed condition until movement of the piston 58 into the chamber has been completed. The piston means 58 is sealed within the cylinder 60 by sealing rings 64. Also, a cylindrical sleeve 66 is provided for keeping the piston means clean and protected during normal operation.

FIG. 5 illustrates the path of movement of the cranking means 18 about a center axis of rotation 68. This canter axis of rotation is fixed relative to the base 40. A cranking pin 70 of the cranking means 18 orbits about the fixed axis 68 in accordance with rotation of a ratchet wheel assembly 16. As clearly shown in FIG. 4, the ratchet wheel assembly includes a ratchet wheel portion 72 which can freely rotate relative to the crankshaft 20 associated with the cranking means 18. The crankshaft 20 carries an eccentric 76 to which the crank pin 70 is attached. Thus, rotation of the crankshaft 20 will cause the eccentric and its crank pin 70 to orbit about the fixed center axis of the crankshaft 20, and the fixed center axis of the crankshaft corresponds to the axis 68 of FIG. 5. Rotation of the cranking means 18 effects a reciprocation of the piston means 58 and there is a slight rocking movement of the entire assembly about the axis 38. As shown in FIGS. 4 and 5, spring means 78 function to normally draw the piston means 58 to its full inward position within the chamber 50. Thus, the cranking means 18 functions to draw the piston means outwardly from the chamber 50 and then to release the piston means for a rapid return movement into the chamber by the action of the spring means 78. The rapid return of the piston means into the chamber 50 effects a pumping of liquid out of the chamber 50 and past the check valve 62. In this sense, the cranking means functions to reciprocate the piston means in one direction only. However, in the context of this specification, and the claims appended hereto, the function of the cranking means is described as an action which reciprocates the piston. Such descriptions are intended to explain the actual relationships and movements just discussed with reference to FIGS. 4 and 5.

It can be seen that the length reciprocal movement of the piston means 58 determines the volume of liquid which is drawn into the chamber 50 with each outward stroke of the piston means. Thus, by adjusting the position of the housing 10, with the adjusting screw 44, the length of stroke of the piston means relative to the chamber 50 can be adjusted. This provides for an adjustment of the quantity of liquid that will be pumped with each complete reciprocation of the piston means.

The ratchet wheel assembly is rotated by the second cranking means 26 shown in FIG. 1. The second cranking means 26 moves a push arm 28 back and forth, and a pawl 30 carried by the push arm engages teeth in the ratchet wheel 72 to rotate the ratchet wheel. Rotation of the ratchet wheel carries the projecting member 24 around the end of crankshaft 20 until the projecting member 24 engages the pin 22. This engagement takes place during the withdrawal portion of the reciprocation cycle of the piston means 58. Once the piston means is fully withdrawn, the pin 22 is in a position to rapidly move away from the projecting portion 24 by the action of the spring means 78 in returning the piston to its inward position in the chamber 50.

It can be seen from FIG. 1 that the stroke of the push arm 28 can be adjusted by securing the push arm to selected positions 80 along the cranking means 26. By adjusting the stroke of the push arm 28, its length of swing is controlled. As can be seen in FIG. 2, the push arm 28 is secured to a plate 82 which can rock freely about the axis of the crankshaft 20. Rocking movements of the plate 82 cause the pawl 30 to be carried for a distance about the periphery of the ratchet wheel 72, and the length of throw of the push arm 28 determines the number of teeth which the pawl 30 passes over with each clockwise movement of the plate 82. A second pawl 32 prevents clockwise rotation of the ratchet wheel 72. By adjusting the number of teeth that are passed over by the pawl 30, it is possible to adjust the rate of rotation of the ratchet wheel assembly 16 with each driving movement (counterclockwise) of the push rod 28 and the plate 82. Increasing the number of teeth passed over by the pawl 30 increases the driving rate of the ratchet wheel, and this increases the frequency at which the projecting portion 24 contacts the crankshaft pin 22.

The second cranking means functions as a control over spacing of dispensed liquid. During each interval when the piston means has made a full return into chamber 50 and has not been reciprocated back out of the chamber there is no dispensing of liquid from the pumping device. Thus, the time it takes for the ratchet wheel projection 24 to catch up with the crankshaft pin 22 determines the spacing between intermittent pumping of liquid.

It has been found that a solid line of marking can be accomplished by a deactivation of the second pawl 32. This is accomplished by moving the pawl out of contact with the ratchet wheel and by setting the push arm 28 to a position for picking up the maximum number of teeth (for example, six teeth on the ratchet wheel which is illustrated). Also, the projection 24 is moved into a position to immediately contact pin 22 to move the piston outwardly from the chamber 50. With this arrangement, each reciprocation of the push arm 28 will move the ratchet wheel and its crankshaft for a sufficient distance to pull the piston means 58 back approximately one-half of its stroke. Then, the springs 78 move the piston back to a full inward position. This is sufficient to maintain a pumping action of the piston means, and to continuously dispense liquid from a nozzle is accomplished. It has been discovered that there is some lag in complete dispensing of all liquid pumped by each stroke (due to volume of liquid in outlet conduit and resistance to flow presented by dispensing nozzle), and this gives the pump time to complete another partial stroke, thereby giving a continuous dispensing effect when desired, when the unit is operated at or above normal speed.

Another feature of the present invention is concerned with a protection of the pumping device in the event that a spray nozzle or a conduit becomes clogged with viscous dye material. In such event, pressure within the conduit and the chamber 50 will increase to a point where movement of the piston means 58 into the chamber becomes virtually impossible. A continued reciprocation of the piston means 58, under such circumstances, could damage portions of the pumping or cranking mechanisms. However, by providing for the pivotal mounting 42 of the entire pumping unit, as related to the base 40 and the fixed axis of cranking means 18, it is possible to rock the entire chamber assembly 10 away from an advancing movement (towards the right in FIG. 5) of the piston means 58 when it becomes impossible for the piston means 58 to push liquid out of the chamber 50. Such rocking movement of the chamber assembly 10 about the axis 42 does not occur during normal pumping operations of the unit, but can occur during normal pumping operations of the unit, but can occur if a conduit or nozzle, downstream of the outlet 54, becomes clogged so as to prevent further effective pumping. This feature prevents accidental damage to the unit.

Although this invention has been described with reference to a preferred embodiment, it can be appreciated that it lends itself to considerable variation by substitution of equivalent components in its construction.

What is claimed is:

1. In agricultural equipment of the type which includes apparatus for applying a liquid onto vegetation or onto the earth, and which includes means for marking the location of the liquid application, the improvement comprising:

a pumping device for intermittently dispensing metered quantities of a marking liquid, said pumping device having:

a chamber for receiving a quantity of liquid to be dispensed, said chamber being defined within a housing, an inlet to said chamber, said inlet providing a communication with a source of supply of the liquid to be dispensed, and said inlet being opened and closed by a one-way valve means which permits flow of liquid into said chamber, an outlet from said chamber for delivering a quantity of liquid from the chamber, said outlet being opened and closed by a one-way valve means which permits flow of liquid out of the chamber, a piston means mounted for reciprocal movements into and out of said chamber, said piston means being received into the chamber in a sealed relationship thereto so that liquid cannot escape from the chamber past the piston means, reciprocating means for imparting reciprocal movements to the piston means to draw a quantity of liquid into the chamber by way of said inlet and to force liquid out of the chamber by way of said outlet, said reciprocating means including cranking means for translating rotary motion into axial motion, said cranking means having a center axis of rotation which is fixed relative to a base portion of the device, adjusting means for adjusting the position of said chamber relative to the center axis of said cranking means so that the quantity of liquid which is drawn into and forced out of the chamber by the piston means can be controlled by the length of travel of the piston means into and out of said chamber, and mounting means for pivotally mounting the housing of said chamber relative to a base upon which it is carried, said pivotal mounting being such that if the outlet side of said pumping device becomes clogged continued reciprocation of said piston means towards said chamber will cause the housing to rock away from the piston means, thereby preventing damage to the device.

2. The improvement of claim 1 wherein said piston means is normally urged by spring means into said chamber for forcing liquid out of the chamber past the one-way outlet valve, and wherein said reciprocating means functions to draw the piston means out of the chamber.

3. The improvement of claim 1 wherein cranking means is rotated by a driving means which engages said cranking means intermittently, thereby providing for intermittent pumping of liquid.

4. The improvement of claim 3 wherein said driving means is operated at a rate which is related to ground speed of a vehicle upon which said device is carried.

5. The improvement of claim 3 wherein said driving means includes a ratchet wheel assembly having a projecting member for periodically engaging a pin means carried by said cranking means.

6. The improvement of claim 5 wherein said ratchet wheel is driven from a second cranking means which includes adjustment means for adjusting the amount of rotation of said ratchet wheel assembly.

7. In a pumping device of the type in which a piston is reciprocated into and out of a chamber within a housing to move liquid into and out of the chamber, the improvement comprising
- a mounting means for said pumping device to prevent damage to the pump in the event that pressure within the chamber is too high for effective pumping, said mounting means including:
- a base portion for supporting the piston and the chamber housing of the pumping device,
- a mounting bracket which carries said chamber housing and which is pivotally mounted relative to said base, said pivotal mounting being about an axis which permits a rocking of the chamber housing away from movements of the piston towards said chamber, when fluid pressure within the chamber is too high to permit a forcing of liquid out of the chamber by the piston.

8. The improvement of claim 7 wherein said piston is reciprocated by a cranking means having a center axis of rotation which is fixed relative to said base.

9. An improved pumping device for intermittently dispensing a metered quantity of liquid, comprising
- a housing having a chamber defined therein for receiving and discharging liquid from a source of supply, said chamber having an inlet and an outlet for controlling the flow of liquid through the chamber, and said inlet and said outlet each being provided with one-way check valve means which prevent a flow of liquid out of the chamber through the inlet and into the chamber through the outlet,
- mounting means for supporting said housing above a base, and a pivotal connection between said housing and said mounting means so that said housing can rock about the pivotal connection and follow the movements of a cranking means while the mounting means remains in a normally fixed position relative to said base,
- a piston means mounted in said housing for reciprocal movements into and out of said chamber, said piston means being fluid sealed in its relationship to the chamber so that liquid is drawn into the chamber by a reciprocation of the piston means in a first direction and liquid is forced out of the chamber by a reciprocation of the piston in a second direction,
- a first cranking means for imparting reciprocal movements to said piston means relative to the chamber within the housing, said cranking means having a center axis of rotation which is fixed relative to said base upon which said housing is supported,
- a ratchet wheel drive assembly for intermittently rotating said first cranking means, said ratchet wheel drive having means for engaging and driving said first cranking means during a portion of a single rotation cycle of the ratchet wheel, and said ratchet wheel being disengaged from driving engagement with the first cranking means during the remainder portion of a single rotation cycle, and
- a second cranking means, and a push arm operatively interconnected between said second cranking means and said ratchet wheel drive assembly so that rotating motion of said second cranking means is imparted to said ratchet wheel drive assembly by way of a pawl means carried by the push arm.

10. The pumping device of claim 9 and including:
- a first adjustment means for adjusting the position of said housing relative to the fixed center axis of rotation of said first cranking means to adjust the volume of liquid drawn into and forced out of said chamber.

11. The pumping device of claim 10 and including:
- a second adjustment means for adjusting the length of said push arm to thereby adjust the amount of rotation of said ratchet wheel assembly.

12. The pumping device of claim 9 and including:
- a pivotal connection between said mounting means and said base so that the housing can be rocked away from its normal operating position in the event that fluid pressure conditions within said chamber are too high to permit entry of said piston means into the chamber.

13. The pumping device of claim 9 wherein said piston means is spring loaded relative to said housing so as to normally urge the piston means into the chamber defined within the housing, and wherein said first cranking means functions to draw the piston means out of the chamber to a point where the piston means is released for being reciprocated back into the chamber by spring means.

14. In agricultural equipment of the type which includes apparatus for applying a liquid onto vegetation or onto the earth, and which includes means for marking the location of the liquid application, the improvement comprising:
- a pumping device for intermittently dispensing metered quantities of a marking liquid, said pumping device having:
- a chamber for receiving a quantity of liquid to be dispensed, said chamber being defined within a housing,
- an inlet to said chamber, said inlet providing a communication with a source of supply of the liquid to be dispensed, and said inlet being opened and closed by a one-way valve means which permits flow of liquid into said chamber,
- an outlet from said chamber for delivering a quantity of liquid from the chamber, said outlet being opened and closed by a one-way valve means which permits flow of liquid out of the chamber,
- a piston means mounted for reciprocal movements into and out of said chamber, said piston means being received into the chamber in a sealed relationship thereto so that liquid cannot escape from the chamber past the piston means,
- reciprocating means for imparting reciprocal movements to the piston means to draw a quantity of liquid into the chamber by way of said inlet and to force liquid out of the chamber by way of said outlet, said reciprocating means including cranking means for translating rotary motion into axial motion, said cranking means having a center axis of rotation which is fixed relative to a base portion of the device,
- driving means for intermittently rotating said cranking means, said driving means including a ratchet wheel assembly having a projecting member for periodically engaging a pin means carried by said cranking means, thereby providing for intermittent pumping of liquid, and
- adjusting means for adjusting the position of said chamber relative to the center axis of said cranking means so that the quantity of liquid which is drawn into and forced out of the chamber by the piston means can be controlled by the length of travel of the piston means into and out of said chamber.

15. The improvement of claim 14 wherein said ratchet wheel is driven from a second cranking means which includes adjustment means for adjusting the amount of rotation of said ratchet wheel assembly.

* * * * *